H. BECK.
METHOD OF AND APPARATUS FOR PREVENTING INJURY OF SEARCHLIGHT MIRRORS.
APPLICATION FILED JUNE 12, 1920.
1,375,996.
Patented Apr. 26, 1921.
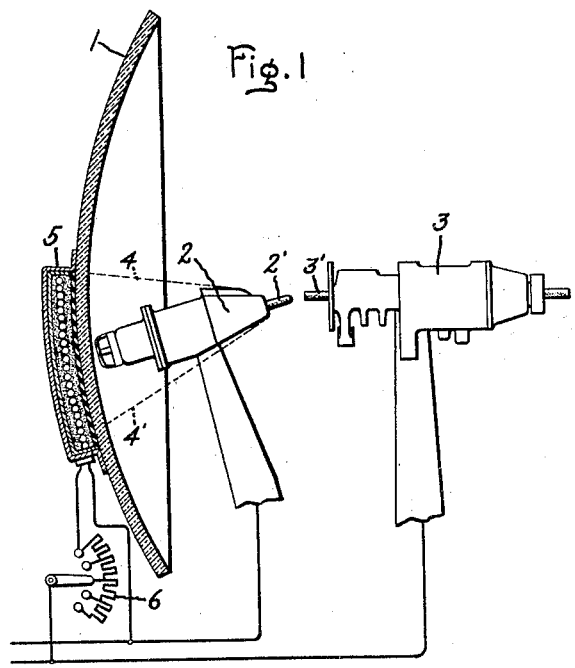
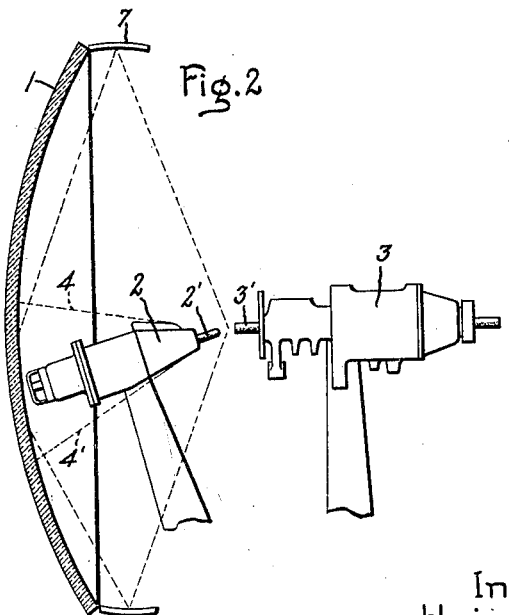
Inventor:
Heinrich Beck,
by *Albert G. Davis*
His Attorney.

UNITED STATES PATENT OFFICE.

HEINRICH BECK, OF SCHENECTADY, NEW YORK, ASSIGNOR TO GENERAL ELECTRIC COMPANY, A CORPORATION OF NEW YORK.

METHOD OF AND APPARATUS FOR PREVENTING INJURY OF SEARCHLIGHT-MIRRORS.

1,375,996.  Specification of Letters Patent.  Patented Apr. 26, 1921.

Application filed June 12, 1920. Serial No. 388,503.

*To all whom it may concern:*

Be it known that I, HEINRICH BECK, a citizen of Germany, residing at Schenectady, county of Schenectady, State of New York, have invented certain new and useful Improvements in Methods of and Apparatus for Preventing Injury of Searchlight-Mirrors, of which the following is a specification.

My invention has reference to improvements in the method of and apparatus for preventing the injury of searchlight mirrors due to their unequal expansion when the searchlight is in operation. In searchlights, it is the general practice to use powerful arc lamps, which emit a great amount of heat, as the source of light. Some part of the lamp, usually the negative electrode mechanism, is disposed between the arc and the mirror, which obstructs the passage of heat rays from the arc to a portion of the mirror surface corresponding substantially to the shadow cast by such mechanism. The part of the mirror from which such heat rays are excluded is considerably cooler than the other portions of the mirror, and when the difference in the expansion of that part of the mirror from which the heat is shielded and the remaining portion of the mirror, reaches a critical point, the mirror cracks or breaks from the resultant strain, usually in the form of an irregular ring substantially following the line dividing the heat shielded portion of the mirror from the remainder of the mirror.

Heretofore, numerous methods have been tried to overcome the difficulties arising from the unequal heating of the mirror. So far as it is known to the applicant, these methods were all based on the same general idea of cooling the hot portions of the mirror, usually by some sort of a ventilating system. In carrying out my invention, I heat the cool portion of the mirror, preferably to a temperature approximately the same as that of the parts which receive the unobstructed heat rays from the arc. The temperature gradient of a mirror is largely determined by the size of the mirror and the current strength employed, and no general rule can be laid down as to what the temperature of the shadow portion of the mirror should be. For example, in a particular mirror, it has been found that if the difference in temperature between the hottest point on the mirror and the center of the shadow is greater than about 60 or 70 degrees C., the mirror will crack, as above set forth. Therefore, in this case if the shadow portion is heated so that its difference in temperature from the hottest point on the mirror is less than 60 or 70 degrees C., no injury to the mirror follows. My invention may also be used in connection with a ventilating system. For example, a ventilating system may be employed to cool the hot portions of the mirror and the cool or shadow portion of the mirror may be heated to a safe temperature. In this way the maximum temperature of the mirror may be reduced.

In the accompanying drawings illustrating apparatus used in accordance with my invention, Figure 1 is a vertical section of a mirror equipped with one type of heating apparatus with the electrode heads in elevation and Fig. 2 is a similar view illustrating a modified form of heating apparatus.

Referring to the drawings, 1 indicates a mirror, 2 a negative head and 3 a positive head, which elements are shown in the relative positions occupied when in a searchlight in operation. The negative and positive heads are provided with electrodes 2' and 3' respectively, the crater of the positive electrode 3' being in the focal point of the mirror 1. From the drawings, it will be seen that the negative head 2 is intermediate the electrode 3' and the mirror 1, and in accordance with well known laws of physics, direct heat rays from the arc are obstructed from the mirror in a field inclosed by the broken lines 4 and 4', which field corresponds substantially to the shadow cast by the negative head. The shadow portion of the mirror between the lines 4 and 4' is therefore cooler than the portions of the mirror receiving direct heat radiation from the arc.

In the preferred form of apparatus employed in carrying out my invention, I provide an electric heating unit 5, which may be of any standard type as shown in Fig. 1. This unit is secured to the back of the mirror in any suitable manner directly over the shadowed portion of the mirror. A variable resistance 6 is placed in the circuit of the heating unit for the purpose of regulating the heating of the shadowed zone. Ordinarily, the unit may be adjusted once for operation under certain conditions, however, a new adjustment may be desirable where these conditions are radically changed, for instance a different adjustment may be necessary during the winter season than that used during the summer season.

Another form of apparatus employed in carrying out my invention is shown in Fig. 2, which consists of a heat reflecting ring 7, preferably of copper, suitably mounted on the periphery of the mirror 1. The surface of the ring 7 is of the proper curvature to reflect the heat from the arc to the shadowed zone.

From the foregoing it will be seen that I have provided a very simple method of preventing injury to reflectors, arising from their unequal expansion, which does not require very refined adjustment. In fact the heating means may be adjusted to heat the shadowed portion to any temperature varying from zero to 60 or 70 degrees C. from the hottest point on the mirror.

Although I have described in the foregoing specification preferred embodiments of my invention, I do not wish to be limited thereto, since various modifications thereof will suggest themselves to those skilled in the art without departing from the spirit of my invention, the scope of which is set forth in the annexed claims.

What I claim as new and desire to secure by Letters Patent of the United States, is:

1. The method of preventing injury to reflectors used with a heat rediating source of light which consists in applying heat to the cooler portions of the reflector.

2. The method of preventing injury to reflectors used with a heat radiating source of light due to its unequal expansion which consists in applying heat to that portion of the reflector which does not receive direct heat radiation from the arc.

3. In a searchlight the method of preventing injury to the mirror due to its unequal expansion which consists in applying heat to that portion of the mirror which is shielded from the direct radiation of the arc.

4. A searchlight comprising a reflector, a source of light which shields a portion of the reflector from the direct heat radiation of the arc and means for heating said shielded portion.

5. A searchlight comprising a reflector, a source of light which shields a portion of the reflector from the direct heat radiation of the arc, and an electric heating element adjacent said shielded portion.

In witness whereof I have hereunto set my hand this 10th day of June, 1920.

HEINRICH BECK.